MEANS TO PROVIDE ELECTRICAL AND MECHANICAL SEPARATION BETWEEN TURNS IN WINDINGS OF A SUPERCONDUCTING DEVICE

Filed Jan. 2, 1968 3 Sheets-Sheet 1

INVENTOR.
James J. Drautman, Jr.
BY
Jackson, Jackson and Chovanes
ATTORNEYS

Jan. 26, 1971 J. J. DRAUTMAN, JR 3,559,126

MEANS TO PROVIDE ELECTRICAL AND MECHANICAL SEPARATION BETWEEN TURNS IN WINDINGS OF A SUPERCONDUCTING DEVICE

Filed Jan. 2, 1968 3 Sheets-Sheet 2

INVENTOR.
James J. Drautman, Jr

BY

ATTORNEYS

INVENTOR.
James J. Drautman, Jr
BY
Jackson, Jackson and Chovanes
ATTORNEYS

United States Patent Office 3,559,126
Patented Jan. 26, 1971

3,559,126

MEANS TO PROVIDE ELECTRICAL AND MECHANICAL SEPARATION BETWEEN TURNS IN WINDINGS OF A SUPERCONDUCTING DEVICE

James J. Drautman, Jr., Annandale, N.J., assignor, by mesne assignments, to Gardner Cryogenics Corporation, Bethlehem, Pa., a corporation of Delaware Filed Jan. 2, 1968, Ser. No. 695,230
Int. Cl. H01f 7/22
U.S. Cl. 335—216 15 Claims

ABSTRACT OF THE DISCLOSURE

An improved superconducting magnet or coil in which the superconductor is wound and positioned by generally longitudinally extending spacers having slots for the turns and ribs between the slots, the spacers also separating layers of the winding and permitting a cryogenic medium to come in intimate contact with the turns. The spacers have an insulating or semiconducting surface and may be of a normal metal or an organic insulating material. The coil may vary in spacing of turns endwise and may vary in diameter from end to end.

DESCRIPTION OF INVENTION

The present invention relates to an improved superconducting magnet or coil, or to related mechanism such as a superconducting inductance, superconducting transformer or other suitable cryogenic coil in which intimate contact between the turns and the refrigerating fluid is required or desirable.

A purpose of the invention is to speed up the starting of a superconducting magnet by permitting more rapid extraction of heat and quicker attainment of a steady state superconducting condition.

A further purpose is to more effectively absorb heat from flux motion incident to change of current in a superconducting magnet.

A further purpose is to permit more rapid startup of a superconducting magnet by a current close to the full critical current.

A further purpose is to permit the production of superconducting coils in which the full critical current of the superconductor can be utilized for magnet operation.

Further purposes appear in the specification and in the claims.

In the drawings I have chosen to illustrate a few only of the numerous embodiments in which the invention may appear, choosing the forms shown from the standpoints of convenience in illustration, satisfactory operation and clear demonstration of the principles involved.

Figures 1, 2, 3, 4, 14:
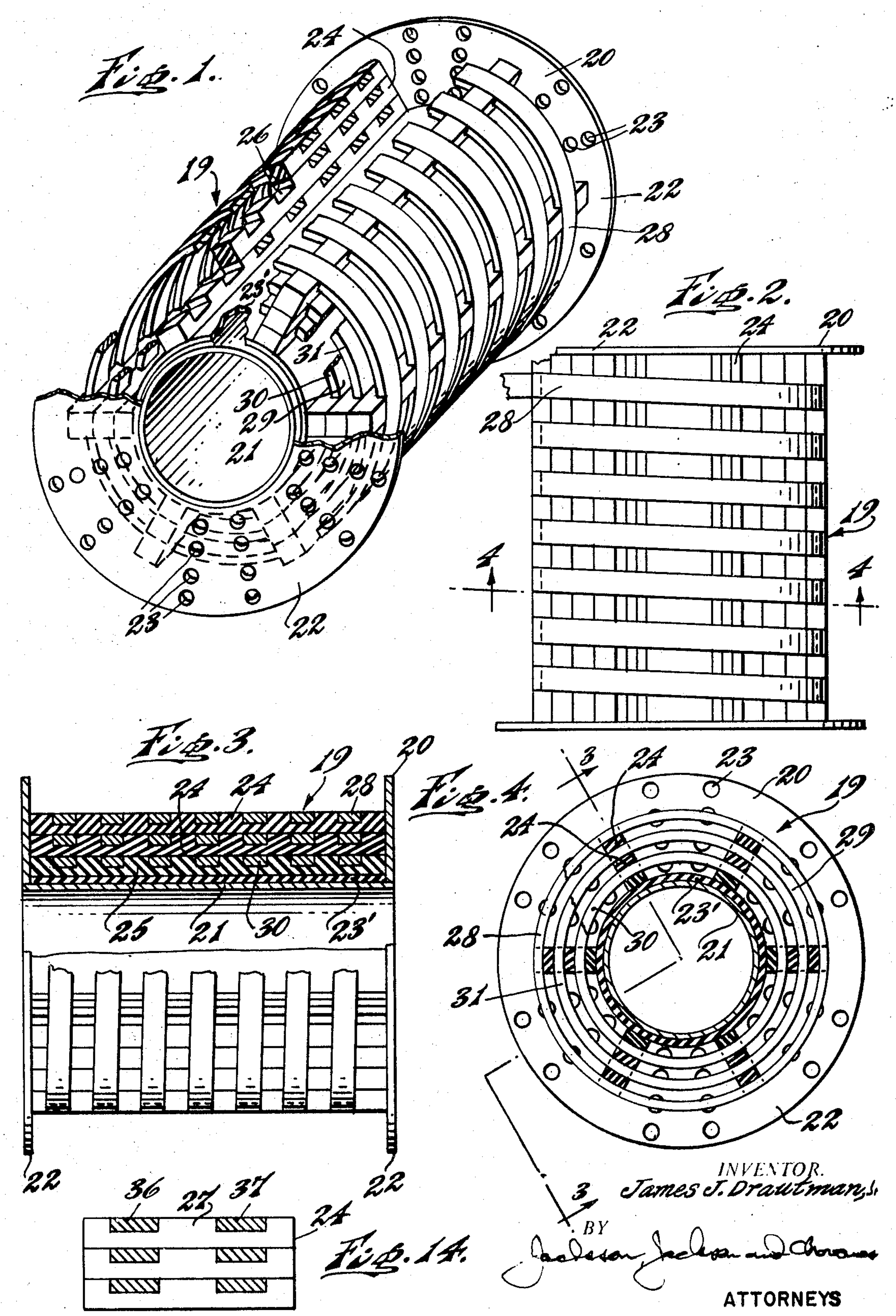
FIG. 1 is a perspective of a magnet according to the invention broken away to show the construction of the winding.
FIG. 2 is a fragmentary plan view of the magnet of FIG. 1.
FIG. 3 is a partial axial section of the magnet of FIGS. 1 and 2, the rest of the view being shown in elevation, the section being taken on the line 3—3 of FIG. 4.
FIG. 4 is a section of FIG. 2 on the line 4—4.
FIG. 14 is a fragmentary axial section through a "pie" wound magnet embodying the principles of the invention.

While it is believed that the best utilization of the invention will be in improved construction of superconducting magnets, it will be understood that the principles of the invention can be employed in superconducting coils of various types including superconducting inductance, components of superconducting transformers, superconducting generator and motor windings. The invention is applicable to dipoles, saddle magnets, and multipole magnets.

Superconducting coils in high field magnets offer distinct advantages, among which are high current density within the windings, since under steady state conditions there is no power dissipated, the DC resistance of the superconductor being zero. It is thus possible to produce very small superconducting magnets which have high fields, and to operate them with very low power input requirements.

Originally superconducting magnets were wound using techniques similar to those used in fabricating normally conducting magnets having windings made of copper, aluminum, sodium or the like. The performance of such superconducting magnets was extremely erratic and superficially similar magnets did not perform in the same way. In addition, these superconducting magnets were not capable of operating under superconducting conditions at the critical current as measured by testing a small specimen of wire immersed in liquid helium. These superconducting magnets became "normal," that is, their windings became resistive, when they were energized by currents much less than the critical current, and accordingly the high superconducting current densities were not obtainable. Because of the great expense of superconductive wire and of superconducting refrigerants and refrigerators required to maintain superconducting conditions, the failure of such prior art magnets to reach full critical current density was very disturbing.

It was later found that the application of a coating of a normal metal such as silver or copper to the superconducting wire greatly improved the performance of the magnets. Since the initial discovery of superconductivity, it has become well known that many so-called Type II superconductors exist which are capable of producing very high flux densities and permitting high critical currents, among which are alloys of niobium and zirconium, alloys of niobium and tin, alloys of niobium and titanium, alloys of vanadium and titanium and alloys of zirconium and gallium. Using Type II superconductors it has been possible more recently to produce superconducting magnets which are quite reproduceable and can be energized to their critical currents using techniques discussed below.

One of the problems which has more recently been understood in producing superconducting magnets is the problem of flux motion within the windings. As the current through the windings is increased, magnetic flux generated by the magnet increases. This flux is pinned to points in the superconductor. As the flux increases further, it penetrates the windings, but it does not penetrate them uniformly as would be the case if the magnet were wound from a normal conductor. The pentration occurs in discrete steps which are called flux jumps. Each of the flux jumps produces a quantity of heat equal to the integral of the magnetization times the field change. This heat may be sufficient to raise the temperature locally above the critical temperature $Tc$ (depending on the composition of the superconductor and the local field and current).

Assuming now that a flux jump occurs in the process of energizing the magnet and the temperature reaches $Tc$, Joulean heating now is produced. The normal region of the magnet may behave in any one of the following ways:

(1) If the thermal conductivity about the normal region is sufficient, the temperature will decrease and the conductor will again become superconducting.

(2) The normal region may stay the same size, leading to power dissipation.

(3) The normal region may grow, causing a large part of the magnet to become resistive and lose its superconductivity, leading to a rapid loss of the magnetic field.

For any given design of a superconducting magnet, as the current increases from zero, it goes through stages 1, 2 and 3 above in order. Thus, at some low current when a flux jump causes a region to become resistive, the $i^2R$ heat can be dissipated and the temperature will decrease until the region becomes again superconducting. At a particular current level which is known as the minimum propagating current, the Joulean heating can no longer be dissipated and the size of the normal zone will grow. Since flux jumping occurs continuously throughout the windings, it is probable that on reaching the minimum propagating current $Ip$, the magnet will quench even though $Ip \ll Ic$, where $Ic$ is the critical current. The value of $Ic$ depends on the nature of the superconductor, the intensity of the flux and the temperature. The value of $Ip$ depends on the thermal conductivity or the thermal diffusivity of the magnet and the geometry of the windings.

Superconductors are said to be completely stabilized when $Ip > Ic$. This can be accomplished in several different ways:

(1) Increase the thermal diffusivity, as by adding lead around the conductor, so that the largest flux jump does not raise the temperature above $Tc$ (I,B).

(2) Increase the effective thermal conductivity of the winding volume as by interleaving copper among the windings.

(3) Decrease the electrical resistance of the normal wire, hence decreasing the $i^2R$ about a normal point by adding a good conductor such as copper or aluminum.

The most common method of achieving stability is the addition of a good conductor as proposed in (3) above. A superconductor is surrounded by a coating of copper, silver, aluminum or other good conducting metal which will maintain its normal conductivity, which is applied by plating, metallurgical bonding or otherwise. When a magnet is wound from such wire the Joulean heat produced when a portion of the wire becomes resistive is sufficiently small that it can be conducted from the resistive region with a temperature rise less than that required to cause the wire to remain at a temperature greater than the critical temperature. Sufficient normal conductor can be added so that this is true for any desired current.

The preferred cryogenic medium for achieving superconducting temperatures is liquid helium although supercritical helium could be used and heat transfer through solids could be employed. If a fluid such as helium is used it penetrates through the windings so that all sections of the winding are wet by it. If this method of cooling is to be used, there must be channels in the winding of a size determined by the maximum heating which is anticipated at any normal region, as well as by the length of the channel and the fluid being used. Thus for different currents, and for different winding configurations, channels of different sizes may be required between the windings.

The present invention contemplates winding superconducting conductors so that the required cooling channels can be formed and maintained throughout the wire, and at the same time internal electric short circuiting can be prevented. The coil of the invention provides support for the windings against the forces present due to winding tension and also the forces of electromagnetic orgin developing during the functioning of the coil.

The spacers may be of any insulating material capable of functioning at low temperature in the cryogenic medium. The spacers are preferably of high heat conductivity and, therefore, they can preferably be made of a metal such as aluminum or aluminum alloy coated with aluminum oxide as by anodizing so as to make them insulating. The spacers may also be of any organic insulating material capable of functioning at the low temperatures such as nylon, polytetrafluoroethylene (Teflon), polytetrafluoroethylene filled with glass fibers, monochlorotrifluoroethylene (Kel-F), paper based phenol-formaldehyde insulation, and the like.

The spacers need not be insulating but they may be semiconducting. This can be accomplished by making them of copper and oxidizing the surface of the copper to form cuprous oxide in situ or it can be done by making them of silver and sulphiding the surface of the silver to form silver sulphide ($Ag_2S$) in situ.

The use of a semiconducting coating on the spacer bar provides a leakage path which will prevent electrical breakdown under high voltage difference which may arise when the magnetic field changes rapidly, and thus guard against arcing between turns.

Figure 15:
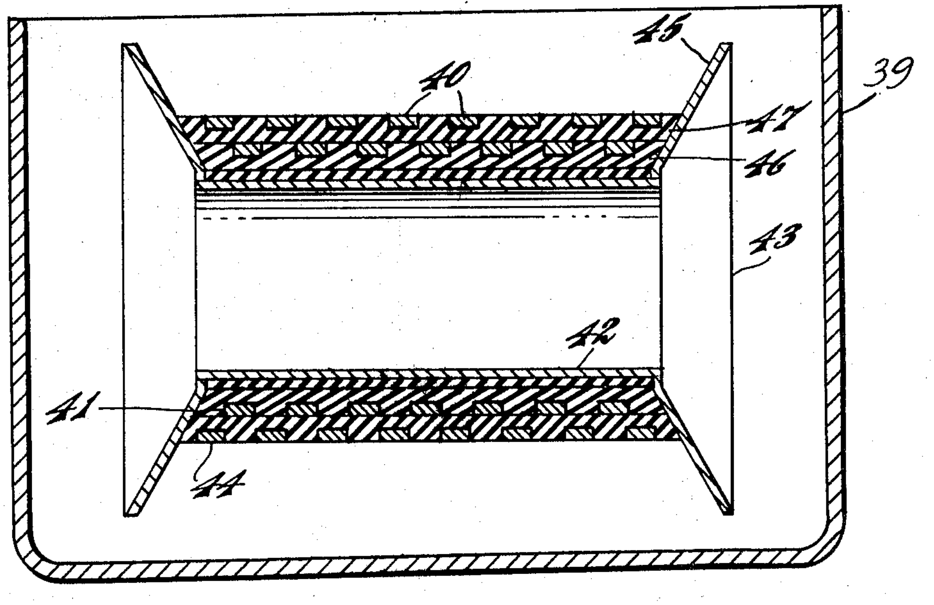
FIG. 15 is a full axial section corresponding to the partial axial section of FIG. 3, but of a coil of modified cross section, the overall annular cross sectional shape being trapezoidal rather than rectangular as in FIG. 3.

In FIGS. 1 to 4 a superconducting magnet 19 is shown which has been wound according to the invention. It consists of a core 20, suitably of stainless steel or other material, having a hub 21 and flanges 22 which have been perforated by cutting openings 23 to permit flow of a cryogenic medium such as liquid helium contained by a container 39 (FIG. 15). The number of openings can be increased or reduced as desired. The hub 21 of the core is optionally surrounded by an insulating layer 23' as an extra precaution. Distributed around the hub 21 in circumferentially spaced relation and extending generally longitudinally are a plurality of spacers 24, each of which has at the inside a back portion 25 which will by its thickness determine the inter-turn spacing, and has on the radial outside a plurality of spacer slots 26 interposed by ribs 27 which will space the turns. A superconducting winding 28 is wound helically extending through the slots 26 of the spacers until one layer 30 of the coil has been wound, then a series of spacers 24 are placed longitudinally in circumferentially spaced relation, desirably immediately outwardly of the first set of spacers 24. The next layer 31 is then wound on the second set of spacers and this procedure continues, adding spacers at corresponding positions for each new layer until the entire coil is formed. Thus cooling passages 29 are provided through the windings.

It will be evident that the spacers need not be identical. For example, they can vary in position of the slots to allow for varying the pitch of the winding if desired, or they can simply be located differently in a longitudinal direction to allow for this.

Likewise the end construction can be adjusted to guard against shorting on the flanges 22 of the winding core, or extra insulation, desirably suitably perforated, can be provided to protect against this.

Figure 10:
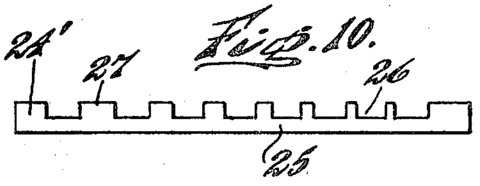
FIG. 10 is a view similar to FIG. 9 but showing the broad concept of variation in space between individual turns.

The spacers 24' can also allow for difference in current density longitudinally of the coil, as is shown in FIG. 10, so as to vary the current density within the windings or to provide for uniform current density when the conductor is non-uniform. Any desired variation of current density may be provided for.

Variation in the distance between slots is useful in producing magnets of high homogeneity or magnets which require a controlled variation in current density as in dipoles.

The variation in distance from one slot to the next with length may be particularly useful in producing dipole fields in which the current density varies as sin $\theta$ and in which the magnet has a circular or annular longitudinal cross section.

Figure 13:
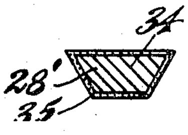
FIG. 13 shows a modified conductor cross section.

The spacers can also be varied to allow for the formation of different sized channels if required due to changing winding configuration. For example, if the conductors 28′ have a trapezoidal cross section as in FIG. 13 the channel must be deeper in one region where the trapezoid is longer.

Figures 5, 6:
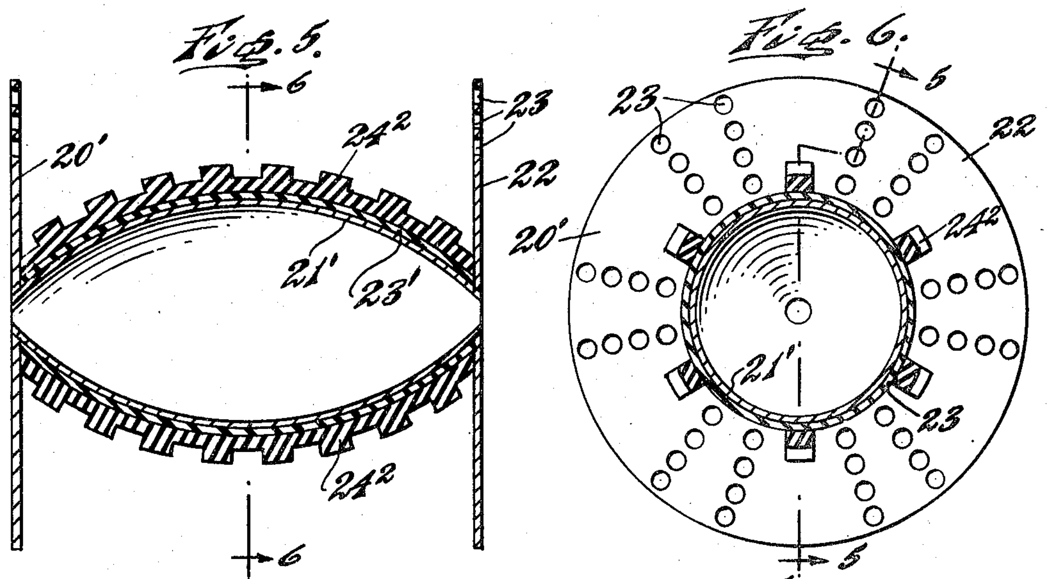
FIG. 5 is an axial section showing the beginning of winding of a coil having a modified cross section, being of large diameter at the center and smaller diameter at the ends, the section being taken on the line 5—5 of FIG. 6.
FIG. 6 is a section on the line 6—6 of FIG. 5.
Figure 7:
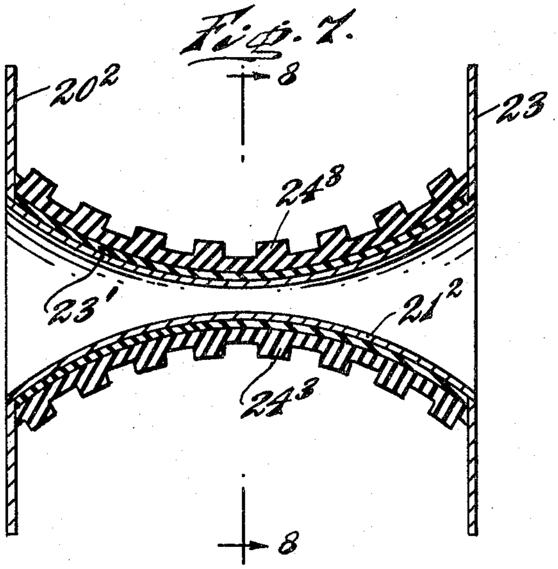
FIG. 7 is an axial section of a further modified shape of coil, the coil being small in the center and large at the ends, the section being taken on the line 7—7 of FIG. 8.
Figure 8:
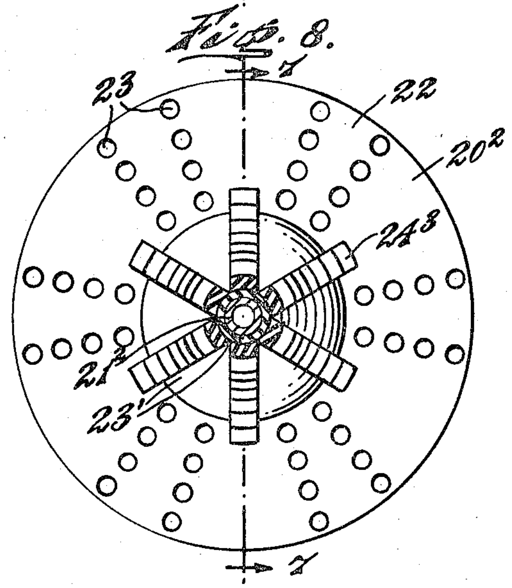
FIG. 8 is a section on the line 8—8 of FIG. 7.
Figure 9:
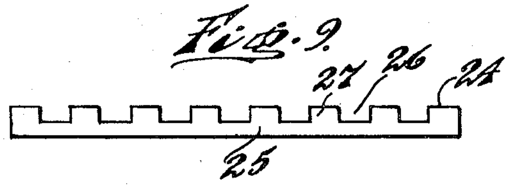
FIG. 9 is a side elevation of an individual spacer according to the invention.

Likewise, the spacers can be longitudinally contoured to permit variation in the diameter of the coil at different points along the length. Thus FIGS. 5 and 6 show convex spacers $24^2$ wound in a core 20′ having a bulbous hub 21′ and FIGS. 7 and 8 show the reverse, having concave spacers $24^3$ wound on a core $20^2$ having a concave hub $21^2$.

The principles of the invention can be applied with other forms of winding than helical winding, for example as shown in FIG. 14 "pie" winding where the turns of one coil 36 and another coil 37 are positioned by spacers 24.

Of course, these different spacers can have allowance made for variation in or correction of flux density if desired.

It will, of course, be evident that a wide choice will be permitted for the spacing between layers of turns, for example, the back portion 25 of the spacer bar can be made thinner or thicker as desired so as to permit certain coil layers to be closer together and certain coil layers to be farther apart.

The spacer location and depth will be varied as required to prevent shorting between turns and to allow for the action of electromagnetic forces present in the energized coil.

The spacer bars whether of metal with insulation or semiconducting coatings or of organic insulation, can be manufactured by machining grooves in sheets or plates or by extrusion or rolling of the desired cross section, and then cutting off to make spacer bars or by any other similar technique. A standard spacer can be made in which the back is as thick as that desired in the widest spacing and spacers having thinner backs can be made by machining away a portion of the back.

The cross section of the conductor 28 may be of any desired form, FI.G 12 showing a rectangular cross section 33 having a superconductor composition 34 at the interior and having a coating or cladding 35 on the outside of a metal such as silver, copper or aluminum which is normal at cryogenic temperatures.

Figure 11:
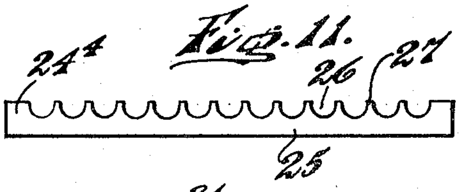
FIG. 11 is a view similar to FIG. 9 showing a spacer which is modified to receive turns of circular cross section.
Figure 12:
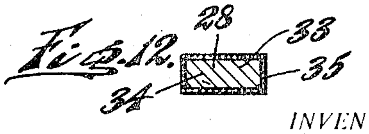
FIG. 12 is a cross section of an individual conductor which may be used in making the magnet of the invention.

FIG. 11 shows a modified spacer $24^4$ in which the slots are arcuate to receive a conductor or circular cross section.

If desired, the winding can assume some form other still than the non-rectangular forms shown in FIGS. 5 through 8.

For example in FIG. 15 is shown a form in which the winding 40 is trapezoidal in overall annular cross-sectional shape, with the bottom series of conductor turns 41 nearest hub 42 of core 43 being not so wide as the next higher series of conductor turns 44, and so on if there should be any additional series of turns. The flanges 45 in such case can flare axially outwardly as they proceed in the radially outward direction, this flare being at an angle to correspond to the widening of the cross section of the winding. The spacers 46 and 47, etc., can likewise be trapezoidal in overall outline, with dimensions to correspond to the distance between the flanges at the particular level involved, and with spacer slots to correspond to the particular positions of the conductor turns at that level. In the particular example being shown, the windings are helical in their overall arrangement.

Any desired or suitable superconducting metal, alloy or compound can be used for the superconducting material as well known in the art.

Figure 16:
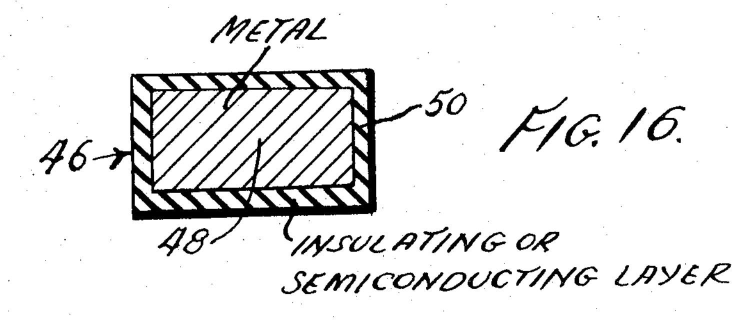
FIG. 16 is a transverse section of a spacer according to the invention which is of the type which has a metallic interior portion, and an insulating or semiconducting outer layer.

In FIG. 16 a spacer 46 is shown in cross section, having a metallic interior portion 48 and an insulating or semiconducting layer 50 on the outside.

In view of my invention and disclosure, variations and modifications to meet individual whim or particular need will doubtless become evident to others skilled in the art to obtain all or part of the benefits of my invention without copying the strucure or process shown, and I, therefore, claim all such insofar as they fall within the reasonable spirit and scope of my claims.

Having thus described my invention what I claim as new and desire to secure by Letters Patent is:

1. A superconducting winding having superconductors wound in turns arranged in layers to form a coil having an axis and insulating spacers extending longitudinally of the axis between the turns, the spacers being spaced circumferentially around the coil, each spacer contacting a plurality of turns of the coil, and the spacers having slots through which the turns extend and ribs between the layers of turns, there being cooling channels provided between the turns for introduction of a refrigerating liquid.

2. A superconducting magnet comprising a superconductor wound into a layer of coil turns, the coil having an axis, a plurality of spacers extending generally longitudinally of the coil axis, provided with slots through which the turns extend, the spacers being distributed at circumferentially spaced points around the coil and having ribs interposed within the turns so as to space the turns radially, each spacer contacting a plurality of turns, and means for maintaining the superconductor in superconducting condition.

3. A superconducting magnet having a superconductor wound into a plurality of layers of coil turns, the coil having an axis, and spacers extending generally longitudinally of the coil axis, interposed between the layers and spaced circumferentially around the coil, each spacer having slots through which the superconductor coil turns extend and having a spacer back portion interposed between layers of coil turns to provide a passage for a cryogenic medium, each spacer contacting a plurality of turns, and means including a cryogenic medium for maintaining the coil at superconducting temperature.

4. A magnet of claim 3, in which the turns are helically wound.

5. A magnet of claim 3, in which the spacers comprise a metal and an insulating layer on the surface of the metal.

6. A magnet of claim 3, in which the spacers comprise aluminum and an insulating layer comprising aluminum oxide on the surface thereof.

7. A magnet of claim 3, in which the spacers comprise a metal and a semiconductor layer on the surface of the metal.

8. A magnet of claim 3, in which the spacers comprise copper and a layer of cuprous oxide on the surface thereof.

9. A magnet of claim 3, in which the spacers comprise silver and a layer of silver sulphide on the surface thereof.

10. A magnet of claim 3, in which the spacers comprise organic insulating material operative at cryogenic temperature.

11. A magnet of claim 3, in which the slots through the spacers are rectangular and the conductors are of rectangular cross section.

12. A magnet of claim 3, in which the slots through the spacers are arcuate and the conductors are of circular cross section.

13. A magnet of claim 3, in which the spacing of the slots varies longitudinally of the spacers.

14. A magnet of claim 3, in which the spacers are curved and the diameter of the coil varies endwise.

15. A superconducting winding having superconductors wound in turns arranged in layers to form a coil having an axis and semiconducting spacers extending longitudinally of the axis between the turns, the spacers being spaced circumferentially around the coil, each spacer contacting a plurality of turns of the coil, and the spacers having slots through which the turns extend and ribs between the layers of turns, there being cooling channels provided between the turns for introduction of a refrigerating liquid.

References Cited

UNITED STATES PATENTS

| | | | |
|---|---|---|---|
| 3,177,408 | 4/1965 | Mills et al. | 335—216X |
| 3,205,461 | 9/1965 | Anderson | 335—216X |
| 3,332,047 | 7/1967 | Borchert | 335—216 |
| 3,363,207 | 1/1968 | Brechna | 335—216 |
| 3,394,330 | 7/1968 | Schindler | 335—216 |
| 3,432,783 | 3/1969 | Britton et al. | 335—216 |

GEORGE HARRIS, Primary Examiner

U.S. Cl. X.R.

336—60; 174—128